United States Patent
Barrenscheen

(10) Patent No.: US 11,663,118 B2
(45) Date of Patent: May 30, 2023

(54) ADDRESS VECTORS FOR DATA STORAGE ELEMENTS

(71) Applicant: Infineon Technologies AG, Neubiberg (DE)

(72) Inventor: Jens Barrenscheen, Munich (DE)

(73) Assignee: Infineon Technologies AG, Neubiberg (DE)

( * ) Notice: Subject to any disclaimer, the term of this patent is extended or adjusted under 35 U.S.C. 154(b) by 128 days.

(21) Appl. No.: 17/198,003

(22) Filed: Mar. 10, 2021

(65) Prior Publication Data

US 2022/0292014 A1    Sep. 15, 2022

(51) Int. Cl.
G06F 12/02      (2006.01)
G06F 12/0808    (2016.01)
G06F 11/10      (2006.01)
G06F 12/14      (2006.01)

(52) U.S. Cl.
CPC ...... *G06F 12/0238* (2013.01); *G06F 11/1004* (2013.01); *G06F 11/1068* (2013.01); *G06F 12/0808* (2013.01); *G06F 12/1408* (2013.01)

(58) Field of Classification Search
CPC ............. G06F 12/0238; G06F 11/1004; G06F 11/1068; G06F 12/0808; G06F 12/1408
See application file for complete search history.

(56) References Cited

U.S. PATENT DOCUMENTS 5,475,849 A  * 12/1995 Ando ............... G06F 15/8069
                                                    712/3
6,968,478 B1 * 11/2005 Edwards ............... G06F 11/10
                                                    714/732
11,223,620 B2 *  1/2022 Serebrin ............... H04L 9/3247
2016/0041922 A1 *  2/2016 Parks .................. G06F 12/1027
                                                    711/207
2016/0179701 A1 *  6/2016 Eddy .................... G06F 12/109
                                                    711/205
2016/0344731 A1 * 11/2016 Serebrin ............... H04L 63/164
2017/0271011 A1 *  9/2017 Sasao .................... G11C 15/04

FOREIGN PATENT DOCUMENTS

WO    WO-2016187029 A1 * 11/2016 ......... G06F 12/1081

OTHER PUBLICATIONS

A. Pajuelo, A. Gonzalez and M. Valero, "Speculative dynamic vectorization," Proceedings 29th Annual International Symposium on Computer Architecture, 2002, pp. 271-280.*

* cited by examiner

*Primary Examiner* — Pierre Michel Bataille
(74) *Attorney, Agent, or Firm* — Shumaker & Sieffert, P.A.

(57) ABSTRACT

In some examples, a device includes a set of data storage elements, wherein each data storage element of the set of data storage elements is associated with a respective valid address vector, and wherein a bit flip in any bit of any of the valid address vectors leads to one of a set of invalid address vectors not associated with any of the set of data storage elements. The device also includes a decoder configured to receive a first address vector as part of a request and to check whether the first address vector corresponds to one of the valid address vectors or to one of the invalid address vectors. The decoder is also configured to select an associated data storage element in response to receiving the request and in response to determining that the first address vector corresponds to one of the valid address vectors.

20 Claims, 11 Drawing Sheets

| CODE = 00 | SETTING 0 |
|---|---|
| CODE = 01 | SETTING 1 |
| CODE = 10 | SETTING 2 |
| CODE = 11 | SETTING 3 |
| PARITY | |

FIG. 4A

| CODE = 000 | SETTING 0 |
|---|---|
| CODE = 001 | ERROR SETTING |
| CODE = 010 | ERROR SETTING |
| CODE = 011 | SETTING 3 |
| CODE = 100 | ERROR SETTING |
| CODE = 101 | SETTING 1 |
| CODE = 110 | SETTING 2 |
| CODE = 111 | ERROR SETTING |

FIG. 4B

| ADDRESS = 1111 | Register R23 |
|---|---|
| ADDRESS = 1110 | Register R22 |
| ADDRESS = 1101 | Register R21 |
| ADDRESS = 1100 | Register R20 |
| ADDRESS = 1011 | Register R13 |
| ADDRESS = 1010 | Register R12 |
| ADDRESS = 1001 | Register R11 |
| ADDRESS = 1000 | Register R10 |
| ADDRESS = 0111 | Register R07 |
| ADDRESS = 0110 | Register R06 |
| ADDRESS = 0101 | Register R05 |
| ADDRESS = 0100 | Register R04 |
| ADDRESS = 0011 | Register R03 |
| ADDRESS = 0010 | Register R02 |
| ADDRESS = 0001 | Register R01 |
| ADDRESS = 0000 | Register R00 |

Address space with minimum Hamming distance of one

FIG. 6

| | |
|---|---|
| ADDRESS = 11111 | |
| ADDRESS = 11110 | Register R23 |
| ADDRESS = 11101 | Register R22 |
| ADDRESS = 11100 | |
| ADDRESS = 11011 | Register R21 |
| ADDRESS = 11010 | |
| ADDRESS = 11001 | |
| ADDRESS = 11000 | Register R20 |
| ADDRESS = 10111 | Register R13 |
| ADDRESS = 10110 | |
| ADDRESS = 10101 | |
| ADDRESS = 10100 | Register R12 |
| ADDRESS = 10011 | |
| ADDRESS = 10010 | Register R11 |
| ADDRESS = 10001 | Register R10 |
| ADDRESS = 10000 | |
| ADDRESS = 01111 | Register R07 |
| ADDRESS = 01110 | |
| ADDRESS = 01101 | |
| ADDRESS = 01100 | Register R06 |
| ADDRESS = 01011 | |
| ADDRESS = 01010 | Register R05 |
| ADDRESS = 01001 | Register R04 |
| ADDRESS = 01000 | |
| ADDRESS = 00111 | |
| ADDRESS = 00110 | Register R03 |
| ADDRESS = 00101 | Register R02 |
| ADDRESS = 00100 | |
| ADDRESS = 00011 | Register R01 |
| ADDRESS = 00010 | |
| ADDRESS = 00001 | |
| ADDRESS = 00000 | Register R00 |

Address space with minimum Hamming distance of two

FIG. 7

| | | |
|---|---|---|
| | ADDRESS = 11111 | ○ ● ⊘ |
| ○ | ADDRESS = 11110 | Register R23 |
| ● | ADDRESS = 11101 | Register R22 |
| | ADDRESS = 11100 | ○ ● ◉ ■ |
| ⊘ | ADDRESS = 11011 | Register R21 |
| | ADDRESS = 11010 | ○ ⊘ ◉ ▨ |
| | ADDRESS = 11001 | ● ⊘ ◉ ▦ |
| ◉ | ADDRESS = 11000 | Register R20 |
| □ | ADDRESS = 10111 | Register R13 |
| | ADDRESS = 10110 | ○ □ ■ ▨ |
| | ADDRESS = 10101 | ● □ ■ ▦ |
| ■ | ADDRESS = 10100 | Register R12 |
| | ADDRESS = 10011 | ⊘ □ ▨ ▦ |
| ▨ | ADDRESS = 10010 | Register R11 |
| ▦ | ADDRESS = 10001 | Register R10 |
| | ADDRESS = 10000 | ◉ □ ■ ▨ ▦ |
| | ADDRESS = 01111 | Register R07 |
| | ADDRESS = 01110 | ○ |
| | ADDRESS = 01101 | ● |
| | ADDRESS = 01100 | Register R06 |
| | ADDRESS = 01011 | ⊘ |
| | ADDRESS = 01010 | Register R05 |
| | ADDRESS = 01001 | Register R04 |
| | ADDRESS = 01000 | ◉ |
| | ADDRESS = 00111 | □ |
| | ADDRESS = 00110 | Register R03 |
| | ADDRESS = 00101 | Register R02 |
| | ADDRESS = 00100 | ■ |
| | ADDRESS = 00011 | Register R01 |
| | ADDRESS = 00010 | ▨ |
| | ADDRESS = 00001 | ▦ |
| | ADDRESS = 00000 | Register R00 |

Address space with minimum Hamming distance of two

FIG. 8

| | | |
|---|---|---|
| | ADDRESS = 11111 | ● |
| | ADDRESS = 11110 | Register R03 |
| | ADDRESS = 11101 | ⊘ |
| | ADDRESS = 11100 | ⊘ |
| | ADDRESS = 11011 | ⊘ |
| | ADDRESS = 11010 | ⊘ |
| ⊘ | ADDRESS = 11001 | Register R02 |
| | ADDRESS = 11000 | ○ |
| | ADDRESS = 10111 | ● |
| | ADDRESS = 10110 | ● |
| | ADDRESS = 10101 | ● |
| | ADDRESS = 10100 | ○ |
| | ADDRESS = 10011 | ● |
| | ADDRESS = 10010 | ○ |
| | ADDRESS = 10001 | ○ |
| | ADDRESS = 10000 | ○ |
| | ADDRESS = 01111 | ● |
| | ADDRESS = 01110 | ● |
| | ADDRESS = 01101 | ● |
| | ADDRESS = 01100 | ○ |
| | ADDRESS = 01011 | ● |
| | ADDRESS = 01010 | ○ |
| | ADDRESS = 01001 | ○ |
| | ADDRESS = 01000 | ○ |
| ● | ADDRESS = 00111 | Register R01 |
| | ADDRESS = 00110 | ○ |
| | ADDRESS = 00101 | ○ |
| | ADDRESS = 00100 | ○ |
| | ADDRESS = 00011 | ○ |
| | ADDRESS = 00010 | ○ |
| | ADDRESS = 00001 | ○ |
| ○ | ADDRESS = 00000 | Register R00 |

Address space with minimum Hamming distance of three

FIG. 9

ADDRESS VECTORS FOR DATA STORAGE ELEMENTS

TECHNICAL FIELD

This disclosure relates to circuitry for data storage.

BACKGROUND

An electronic device may include data storage elements such as configuration registers for storing data relating to the operation of the electronic device. For example, the configuration registers on a gate driver device can store a target magnitude for the current outputted by the gate driver device. As another example, the configuration registers on a power management integrated circuit (PMIC) can store a target magnitude for the voltage outputted by the PMIC. An external device such as a microcontroller may write data to a particular configuration register onboard the electronic device by sending a write request to the electronic device. The write request may include the data and an address of the particular configuration register.

SUMMARY

This disclosure describes techniques for creating an address space for data storage elements. The address space can include a set of valid address vectors and a set of invalid address vectors, where each valid address vector is associated with a data storage element, and each invalid address vector is not associated with any of the data storage elements. A bit flip of any of the valid address vectors of a first subset of data storage elements may result in one of the invalid address vectors.

The techniques of this disclosure may allow for the spacing of address vectors for a first subset of data storage elements that are configured to store safety-relevant data. The address vectors of the safety-relevant storage elements can be spaced such that a bit flip of one of the address vectors does not result in data written to or read from an incorrect data storage element.

In some examples, a device includes a set of data storage elements, wherein each data storage element of the set of data storage elements is associated with a respective valid address vector, and wherein a bit flip in any bit of any of the valid address vectors leads to one of a set of invalid address vectors not associated with any of the set of data storage elements. The device also includes a decoder configured to receive a first address vector as part of a request and to check whether the first address vector corresponds to one of the valid address vectors or to one of the invalid address vectors. The decoder is also configured to select an associated data storage element in response to receiving the request and in response to determining that the first address vector corresponds to one of the valid address vectors.

In some examples, a method includes receiving, by a decoder, a first request including a first address vector, wherein each data storage element of a set of data storage elements is associated with a respective valid address vector, and wherein a bit flip in any bit of any of the valid address vectors leads to one of a set of invalid address vectors not associated with any of the set of data storage elements. The method also includes checking, by the decoder, whether the first address vector corresponds to one of the valid address vectors or to one of the invalid address vectors. The method further includes selecting, by the decoder, an associated data storage element in response to receiving the first request and in response to determining that the first address vector corresponds to one of the valid address vectors.

In some examples, a system includes a communication slave device and a communication master device coupled via a communication interface to the communication slave device and configured to exchange data with the communication slave device. The communication slave device includes a set of data storage elements, wherein each data storage element of the set of data storage elements is associated with a respective valid address vector, and wherein a bit flip in any bit of any of the valid address vectors leads to one of a set of invalid address vectors not associated with any of the set of data storage elements. The communication slave device includes a decoder configured to receive a first address vector as part of a request from the communication master device. The decoder is also configured to check whether the first address vector corresponds to one of the valid address vectors or to one of the invalid address vectors. The decoder is further configured to select an associated data storage element in response to receiving the request and in response to determining that the first address vector corresponds to one of the valid address vectors.

The details of one or more examples are set forth in the accompanying drawings and the description below. Other features, objects, and advantages will be apparent from the description and drawings, and from the claims.

BRIEF DESCRIPTION OF DRAWINGS

FIGS. 4A and 4B illustrate the distribution of codes using a parity generation function, in accordance with the techniques of this disclosure.

FIG. 6 illustrates an address scheme in which the valid addresses have a minimum Hamming distance of one.

FIGS. 7 and 8 illustrate an address scheme in which the valid addresses have a minimum Hamming distance of two, in accordance with the techniques of this disclosure.

FIG. 9 illustrates an address scheme in which the valid addresses have a minimum Hamming distance of three, in accordance with the techniques of this disclosure.

DETAILED DESCRIPTION

Figure 1A:
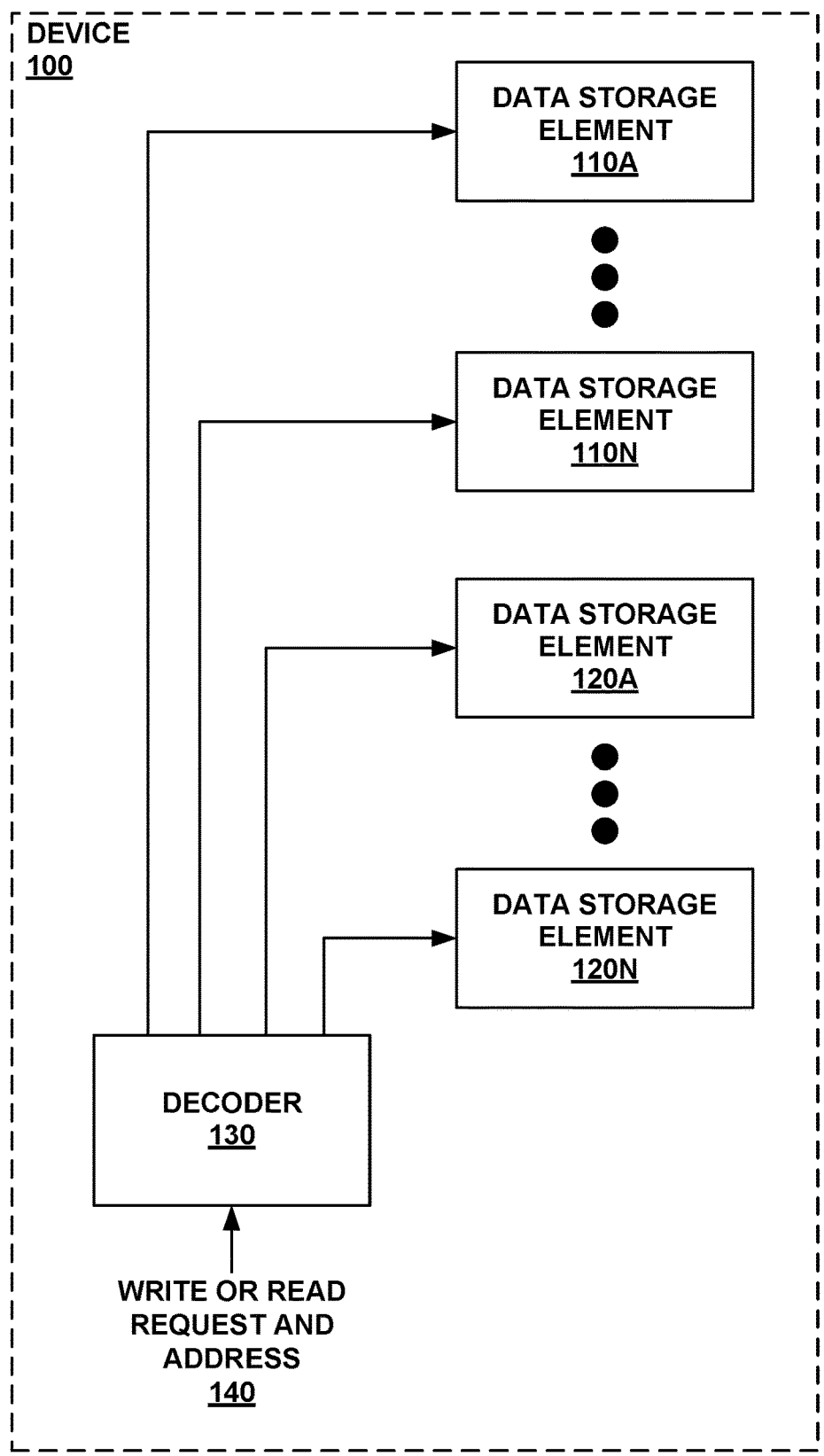
FIG. 1A is a conceptual block diagram of a device including two subsets of data storage elements, in accordance with the techniques of this disclosure.

This disclosure describes devices, methods, and techniques for an address scheme for a set of data storage elements. The address scheme includes valid address vectors that are associated with data storage elements and invalid address vectors that are not associated with any of the data storage elements. The valid address vectors for data storage elements are designed so that a single-bit flip of any bit position in any valid address vector does not result in any other valid address vector. In some examples, these data storage elements may be configured to store information that is important for the operation of a device or system.

The address scheme can protect data storage elements from incorrect write and read requests because a bit flip in an address vector results in an invalid address vector. If a bit flip in a first valid address vector would lead to second valid address vector, the data relating to the second valid address vector could be corrupted by an operation targeting the data relating to the first valid address vector. Thus, a minimum difference between any two valid address vectors may be at least two bits. The term "difference" between two address vectors may refer to the number of different bits in a binary representation of the address vectors. For example, a first address vector A and a second address vector B=A+16 (in decimal representation) would lead only to a difference of one bit in the two address vectors, whereas the numerical representation shows a difference of 16 (decimal). For example, a first address vector A=3 in decimal representation and a second address vector B=4 in decimal representation show a difference of three bits.

The valid address vectors may be distributed such that the address locations differ by more than one address bit. There may be no data storage elements that can be selected or accessed by modifying only one address bit of a valid address vector of a data storage element that stores important information.

Important information may relate to a safety-critical operation of the device. In the following, the wording "safety-critical" may refer to data that has to be robust against several types of corruption mechanisms. This may include corruption of the data storage element itself, the path from or to the data storage element, as well as the selection mechanism of a single data storage element for a read or write operation. Examples of important or safety-critical data include output settings of power stages, such as gate drivers or power supplies, configurable thresholds of monitoring units or configurable event reactions, e.g., to define which event leads to which reaction.

The wording "data storage element" may refer to one or more bits or bit fields that can be accessed at a given address in the address range. For example, the actual number of data bits in data storage element may be 8, 16, 32, or any other number of bits, depending on how many data bits can be accessed in parallel by a read operation or by a write operation to the data storage element.

In contrast, address vectors that are associated with data storage elements that store non-safety-relevant information can be more tightly spaced. In some examples, all single-bit stuck-at errors, bit flip errors, or short circuits starting from a valid address vector automatically lead to an invalid address vector. An invalid address vector may be an empty address location that is not associated with a data storage element. To accomplish this spacing, the minimum number of address bits plus at least one additional address bit can be used to represent the addresses of data storage elements. The minimum number of bits may be based on or derived from the number of data storage elements. For example, four address bits are capable of representing up to sixteen addresses for storage elements.

A signature function can be used to generate the valid address vectors. One example signature function generates one or more parity bits that are appended to each address vector. The one or more parity bits appended to valid address vectors may distinguish between valid and invalid address vectors. The signature function may ensure that the valid addresses of the data storage elements have a Hamming distance of at least two compared to all other valid address vectors.

FIG. 1A is a conceptual block diagram of a device 100 including two subsets of data storage elements 110A-110N and 120A-120N, in accordance with the techniques of this disclosure. Device 100 includes data storage elements 110A-110N and 120A-120N and decoder 130. Each of data storage elements 110A-110N and 120A-120N may be associated with a unique valid address vector, such that each valid address vector is associated with only one of data storage elements 110A-110N and 120A-120N. Data storage elements 110A-110N and 120A-120N may include memory cells, registers, flip-flops, and/or another other elements for storing data. Although FIG. 1A depicts two subsets of data storage elements 110A-110N and 120A-120N, device 100 may include only one set of data storage elements 110A-110N.

Data storage elements 110A-110N may be configured to store a first type of data, such as safety-related data or data that is used by device 100 to generate an output or to monitor an input. For example, data storage elements 110A-110N may include configuration registers for storing safety-related data for device 100. In some examples, the architecture, bit length, and other characteristics of data storage elements 110A-110N are identical to the architecture, bit length, and other characteristics of data storage elements 120A-120N. In other examples, the architecture, bit length, and/or other characteristics of data storage elements 110A-110N may be different from the architecture, bit length, and/or other characteristics of data storage elements 120A-120N. For example, data storage elements 110A-110B may be constructed differently than data storage elements 120A-120N.

The address vectors of data storage elements 110A-110N may be distributed such that each valid address vector of one of data storage elements 110A-110N is at least two or more bits different from every other valid address vector of data storage elements 110A-110N and 120A-120N. Thus, in some examples, the address vectors of data storage elements 120A-120N may not fill in the gaps between the address vectors of data storage elements 110A-110N. In other words, toggling a bit of an address vector associated with data storage element 110A may result in an invalid address vector that is not associated with any of data storage elements 110A-110N and 120A-120N.

Optional data storage elements 120A-120N may be configured to store a second type of data. The second type of data may be different from the first type of data. The second type of data may include data that device 100 is not critical to the operation of device 100. Thus, an error in the data stored in data storage elements 120A-120N may not result in damage to device 100 or to another device.

The address vectors of data storage elements 120A-120N may be at least two or more bits different from every valid address vector of data storage elements 110A-110N. However, the address vectors of some or all of data storage elements 120A-120N may be only one bit different from an address vector of other data storage elements 120A-120N. Thus, there may not be any spacing between data storage elements 120A-120N because industry standards may be less strict for the type of data stored in data storage elements 120A-120N than for the type of data stored in data storage elements 110A-110N. In some examples, toggling a bit of an address vector associated with data storage element 120A may result in an address vector that is associated with another one of data storage elements 120B-120N but may not result in an address vector that is associated with any of data storage elements 110A-110N. Some examples for data storage elements 120A-120N include block-wise organized memory, such as random access memory (RAM), read-only memory (ROM), or flash memory.

In the example of FIG. 1A, decoder 130 receives request 140 (e.g., a read request or a write request) that includes an address vector. Decoder 130 can receive request 140 from another part of device 100 or from a source that is external to device 100, such as a microcontroller. Decoder 130 may be configured to check whether the address vector received with request 140 corresponds to a set of valid address vectors. Additionally, in some examples, decoder 130 is configured to check whether the address vector received with request 140 corresponds to a set of invalid address vectors. Decoder 130 may include digital circuitry that is configured to check the address vector. Additionally or alternatively, decoder 130 may include processing circuitry that is configured to execute instructions that cause the processing circuitry to check the address vector.

Decoder 130 may be configured to determine whether the address vector received with request 140 corresponds to a valid address vector by determining whether the address vector in the request matches any of the address vectors associated with data storage elements 110A-110N and 120A-120N. In response to determining that the address vector received with request 140 corresponds to a valid address vector, decoder 130 may be configured to select the associated data storage element for data access. Decoder 130 can select data storage element 110A for data access, for example, by activating a line connected between decoder 130 and data storage element 110A.

In examples in which request 140 includes a read request, decoder 130 may be configured to establish a read path to the data stored in data storage element 110A in response to determining that the address vector received with request 140 matches the address vector associated with data storage element 110A. In examples in which request 140 includes a write request, decoder 130 may be configured to establish a write path to write data received with the write request to data storage element 110A in response to determining that the address vector received with request 140 matches the address vector associated with data storage element 110A.

In response to determining that the address vector received with request 140 corresponds to an invalid address vector, decoder 130 may be configured to output an indication that the address vector is invalid. The indication may be an alert or another signal that can include the invalid address vector. Decoder 130 may be configured to output the indication to another part of device 100 and/or to a component that is external to device 100. In some examples, decoder 130 is configured to output the indication to the component or circuit that transmitted request 140 to decoder 130.

Device 100 may include an internal data bus that provides a connection between decoder 130 and data storage elements 110A-110N and 120A-120N. In an existing device, the number of address bits on the internal data bus depends either on the number of addresses delivered by the communication channel (e.g., serial peripheral interface (SPI)) or by the number of address vectors in data storage elements 110A-110N and 120A-120N. There may be a checksum or parity bit on the address lines of an existing internal data bus, but this parity or checksum is generated locally from the received address information in the communication receiver. The design of device 100 may include parity or checksum information already in the address vector that is transferred via the communication channel, which may be extracted from the header files during code generation. Thus, each address vector may be at least one bit longer than needed to address a set of address vectors in an existing device. This additional bit may not add much cost or complexity where the number of data storage elements 110A-110N is quite low or there are already enough address lines available.

Figure 1B:
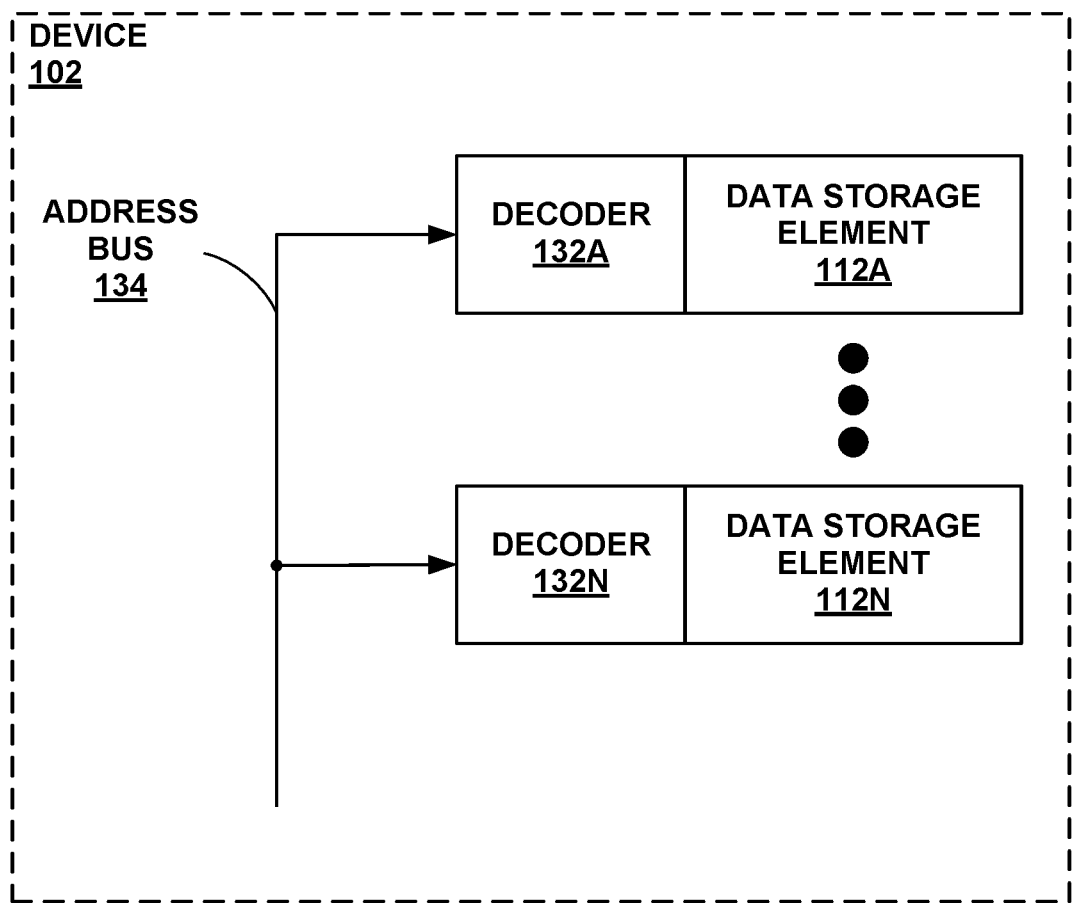
FIG. 1B is a conceptual block diagram of a device including a separate decoder for each data storage element, in accordance with the techniques of this disclosure.

FIG. 1B is a conceptual block diagram of a device 102 including separate decoders 132A-132N for each of data storage elements 112A-112N, in accordance with the techniques of this disclosure. Each of decoders 132A-132N may be configured to check whether an address vector in a request matches the address vector associated with a respective one of data storage elements 112A-112N.

For example, decoder 132A may include a comparator configured to compare an address vector received from address bus 134 to the address vector associated with data storage element 112A. In response to determining that the address vector received from address bus 134 matches the address vector associated with data storage element 112A, decoder 132A may be configured to establish an access path to data storage element 112A. In response to determining that the address vector received from address bus 134 does not match the address vector associated with data storage element 112A, decoder 132A may be configured to ignore the request received from address bus 134. An additional error check circuit may be configured to detect if an access is requested but no data storage element has been selected. In this case, the error check circuit may be configured to output an error indication in response to detecting that an access was requested but no data storage element was selected. The error check circuit may be part of one or more of decoders 132A-132N, or the error check circuit may be built as independent unit. In examples in which all of decoders 132A-132N determine that the address vector received from address bus 134 does not match the respective address vector associated with data storage elements 112A-112N, a bus master circuit may be configured to receive the error indication.

Figure 2:
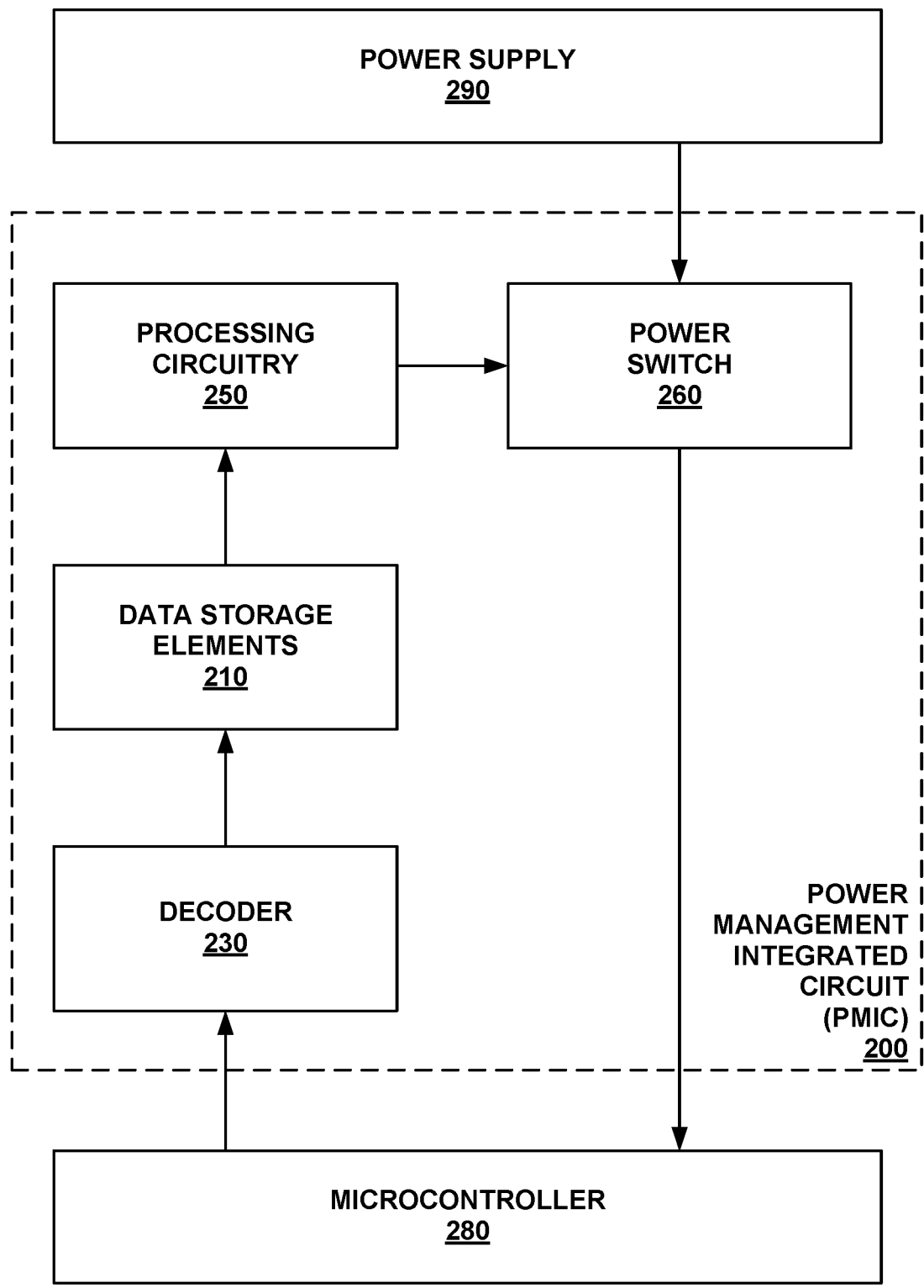
FIG. 2 is a conceptual block diagram of a system including a power management integrated circuit, in accordance with the techniques of this disclosure.

FIG. 2 is a conceptual block diagram of a system including a power management integrated circuit (PMIC) 200, in accordance with the techniques of this disclosure. In addition to PMIC 200, the system also includes microcontroller 280 and power supply 290. Microcontroller 280 may be referred to as a master device, and PMIC 200 may be referred to as a slave device. In the example shown in FIG. 2, PMIC 200 is configured to receive read requests and/or write requests from microcontroller 280, and PMIC 200 is also configured to deliver power from power supply 290 to microcontroller 280 based on the data stored in data storage elements 210. PMIC 200 and microcontroller 280 may be coupled to the same printed circuit board (PCB). For example, PMIC 200 and microcontroller 280 may be mounted on the same PCB.

In the example shown in FIG. 2, PMIC 200 includes data storage elements 210, decoder 230, processing circuitry 250, and power switch 260. PMIC 200 may also include a gate driver configured to activate and deactivate power switch 260 based on control signals received from microcontroller 280.

Processing circuitry 250 may be configured to read data from one or more of data storage elements 210 and control power switch 260 based on the retrieved data. For example, processing circuitry 250 may be configured to determine a magnitude of voltage or current for power switch 260 to deliver from power supply 290 to microcontroller 280 based on the retrieved data.

Data storage elements 210 may include one or more safety-relevant storage elements that store data indicating a threshold magnitude of current for power switch 260. Processing circuitry 250 can receive a sensed signal from a sensor that indicates the current being conducted by power switch 260. Processing circuitry 250 may be configured to deactivate power switch 260 in response to determining that the current conducted by power switch 260 is greater than or equal to the threshold magnitude.

Microcontroller 280 may be configured to control the operation of PMIC 200 by sending control signals and/or data to PMIC 200. For example, microcontroller 280 can send a write request to PMIC 200 that includes configuration data that PMIC 200 will use during the operation of PMIC 200. PMIC 200 may be configured to store the data in the write request to data storage elements 210, and processing circuitry 250 may be configured to retrieve the data from data storage elements 210 during the operation of PMIC 200.

Microcontroller 280 may include a component with a low safety rating because the addressing scheme for data storage elements 210 provides sufficient safety. In some examples, components inside microcontroller 280 may have an Automotive Safety Integrity Level (ASIL) safety rating of Quality Management (QM), which is the lowest ASIL rating. For example, the communication path between microcontroller 280 and PMIC 200 may have a low safety rating if the structure itself is robust against single bit flips. The techniques of this disclosure can be used to design and build data structures or address structures that can be used in safety-related applications with ratings up to ASIL B rating, even where components of microcontroller 280 have a lower safety rating than the overall system. An existing system with a microcontroller rated at ASIL B may be able to use another microcontroller rated at ASIL A or QM if the addressing techniques described herein are used to protect against bit flips in the address vectors.

For example, the communication interface of microcontroller 280 may have an ASIL rating that is lower that an ASIL rating of the function of PMIC 200 that is controlled by the data transferred across the communication interface. This lower ASIL rating may allow for less expensive and/or less complex components to be used for a system, while maintaining the safety of the system. The PMIC 200 may be designed to fulfill a function such as generating an output or monitoring an input. In the example shown in FIG. 2, a function of PMIC 200 may be the delivery of electrical power from power supply 290 to microcontroller 280.

The techniques of this disclosure may alleviate the need for additional check mechanisms on the read path and the write path connected to data storage elements 210. These techniques may also simplify the handling of these data structures in microcontroller 280 for the code generation phase. The addressing scheme described herein can be used for data storage elements 210 in PMIC 200 and/or for data storage elements within microcontroller 280.

Figure 3:
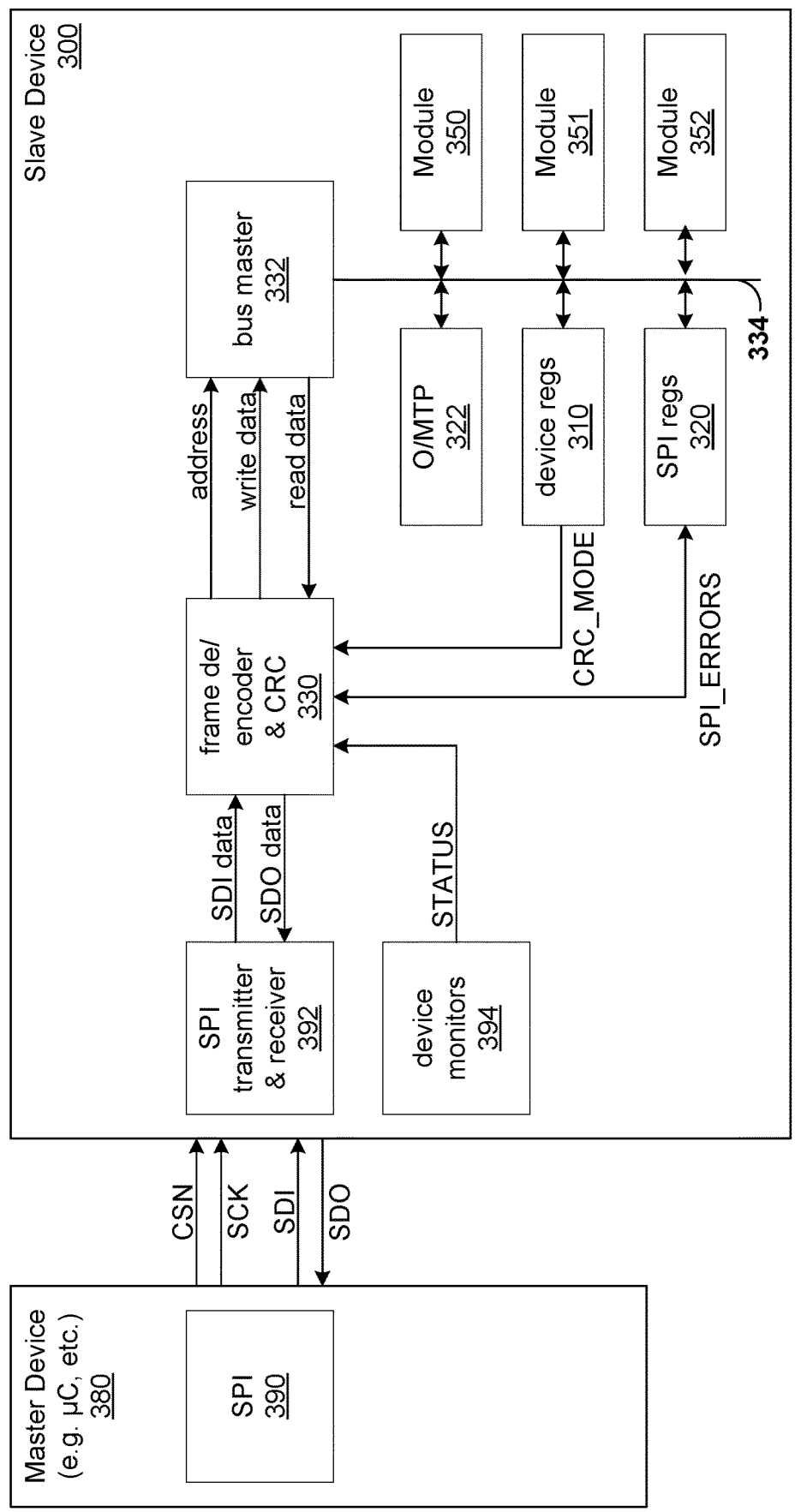
FIG. 3 is a conceptual block diagram illustrating communication between a master device and a slave device that includes a plurality of registers, in accordance with the techniques of this disclosure.

FIG. 3 is a conceptual block diagram illustrating communication between a master device 380 and a slave device 300 that includes a plurality of registers 310 and 320, in accordance with the techniques of this disclosure. Modules 350, 351, 352 may contain additional registers or data storage elements. Depending on the function of a module, the data stored in the data storage elements may or may not be safety relevant. Master device 380 may include a microcontroller or any type of processor unit, and slave device 300 may include a PMIC, an actuator driver, or a sensor. Devices 300 and 380 may be mounted on the same PCB, and/or devices 300 and 380 may be integrated onto the same substrate, in some examples. Communication master device 380 or another master device may be configured to initiate data transfers between communication master device 380 and communication slave device 300 or another slave device. Communication master device 380 may define the type of data transfer (read or write) and the target address. Communication slave device 300 may be configured to receive and execute the data transfer request issued by communication master device 380. The communication between both of devices 300 and 380 may be handled by a communication interface, such as SPI or the like.

SPI circuitry 390 of master device 380 may be configured to transfer data to SPI circuitry 392 of slave device 300 for storage in one of the data storage elements in device 300. The data may include a configuration value that slave device 300 can use for the operation of one of modules 350-352. Master device 380 can send a data word via SPI circuitry 390 for storage in device 300. The SPI communication may be protected by a checksum mechanism, but the transfer of the data within slave device 300 may not be protected. For example, the transfer from the SPI receive register within SPI circuitry 392 to one of the registers inside device 300 occurs via structures that are internal to slave device 300, such as bus master 332 and internal data bus 334. Thus, the checksum protection of the SPI transfer may end at the SPI receive register. Device 300 may include non-volatile memory unit 322. Non-volatile memory may be used to store data that can be read after a power down of device 300. There are different types of non-volatile memory, such as one time programmable (OTP) or multiple times programmable (MTP) of flash memory, which may be programmable for a large number of times. To prevent data from being corrupted during the internal transfer from the SPI receive register or from non-volatile memory to the configuration registers (e.g., in the modules), slave device 300 may use a safety measure such as a parity bit on internal data bus 334. Additional safety measures may involve additional circuitry, such as more bit lines on internal data bus 334, as compared to a device without any protection.

The configuration registers may contain the configuration data bit field and an addition checksum bit field (e.g., a parity bit). The configuration data and the checksum are transferred as data payload from the SPI receive register to the configuration register. This approach can provide end-to-end protection to address the problem of data corruption during the transit of data within slave device 300.

In safety-related applications, single-bit errors can occur that result in an incorrect address vector. In examples including digital structures, such as parallel multi-bit data structures or buses, a bit or a connection between units may be open, have a stuck error, have a bit flip error, or have a short to a neighbor line. In the case of a short to a neighbor line, the data contents of one of the two shorted lines may show an error because one line will deliver a correct value, and the other line may deliver a corrupted or incorrect value. There are several counter-measures to address these errors, such as using additional bits or connections delivering check sum information. The simplest way to provide a checksum is to deliver a parity bit in addition to the bits in the desired data structure.

Some data structures are relevant for safety, such as a configuration bit field, a control bit field, or a status bit field. For safety-relevant data structures, each single bit position of the data structure can be built by a safety-flip-flop cell. Such a safety-flip-flop cell can include more than one storage element to store the same information in case one of the storage elements experiences a fault. In examples in which two redundant storage elements are configured to store the same data, an error of one storage element can be detected, but it may be impossible to determine which storage element contains the correct data and which storage element is corrupted. The device may be configured to output an indication of an error in response to determining that one of the storage elements has error.

In examples in which three redundant storage elements are configured to store the same data, an error of one storage element can be detected and corrected, because the remaining two storage elements are considered being correct. Thus, the device can operate under a single error assumption by resetting the anomalous bit value to the value stored in the other two storage elements. Such an approach implies additional checkers or other hardware. In examples in which a configuration bit field is four bits wide, the total amount of storage cells would be twelve to store three versions of the four-bit data structure. In contrast, adding a parity bit to the stored data results in five storage cells to detect a single error, but does not provide correction capability.

The safety-flip-flop approach can protect against bit flips during storage time but does not protect against bit flips in the data that can occur during writing or reading. In some examples, the data will be corrupted during transmission to the safety-flip-flop, and a corrupted, but incorrect, value will be stored without any indication of the error. Thus, additional mechanisms may have to be introduced to ensure the safety of the write path and the read path. A parity bit or any other kind of checksum can be used with a data structure in communication systems.

FIGS. 4A and 4B illustrate the distribution of codes using a parity generation function, in accordance with the techniques of this disclosure. The data structures shown in FIGS. 4A and 4B include a two-bit code and an additional checksum (e.g., one parity bit) is stored in addition to the data structure. In the examples shown in FIGS. 4A and 4B, the third bit is a parity bit added for even parity. The decoder may include a checker circuit that is configured to check the contents of the data structure against the checksum. The checker circuit can output an indication of an error in response to determining that the data structure does not match the checksum. In some examples, the checksum may be considered as independent information, separate from the coding for each setting.

In response to determining that a parity error exists, the decoder may be configured to output an error setting. In some examples, the error setting may be identical to a reset setting. Another representation, shown in FIG. 4B, is achieved if the parity bit is treated as an additional code bit. FIG. 4B shows an example three-bit-long code where the most significant bit of the code is the parity bit of the two least significant code bits. As shown in FIG. 4B, there are four valid data structures and four invalid structures in a set of eight possible codes.

Figure 5A:
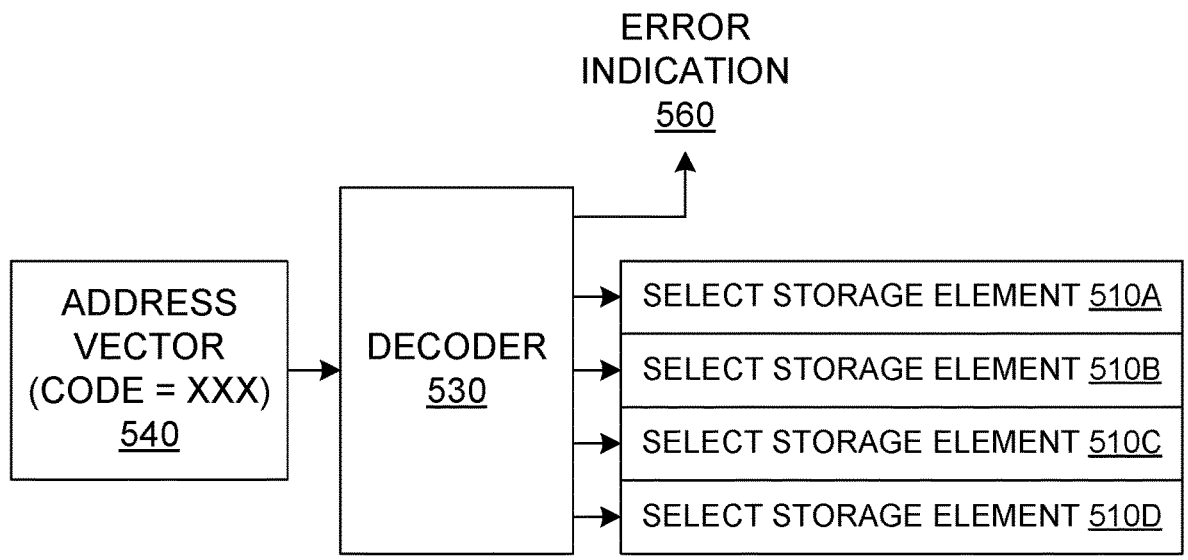
FIGS. 5A and 5B are conceptual block diagrams of decoders for checking whether an address vector is valid, in accordance with the techniques of this disclosure.
Figure 5B:
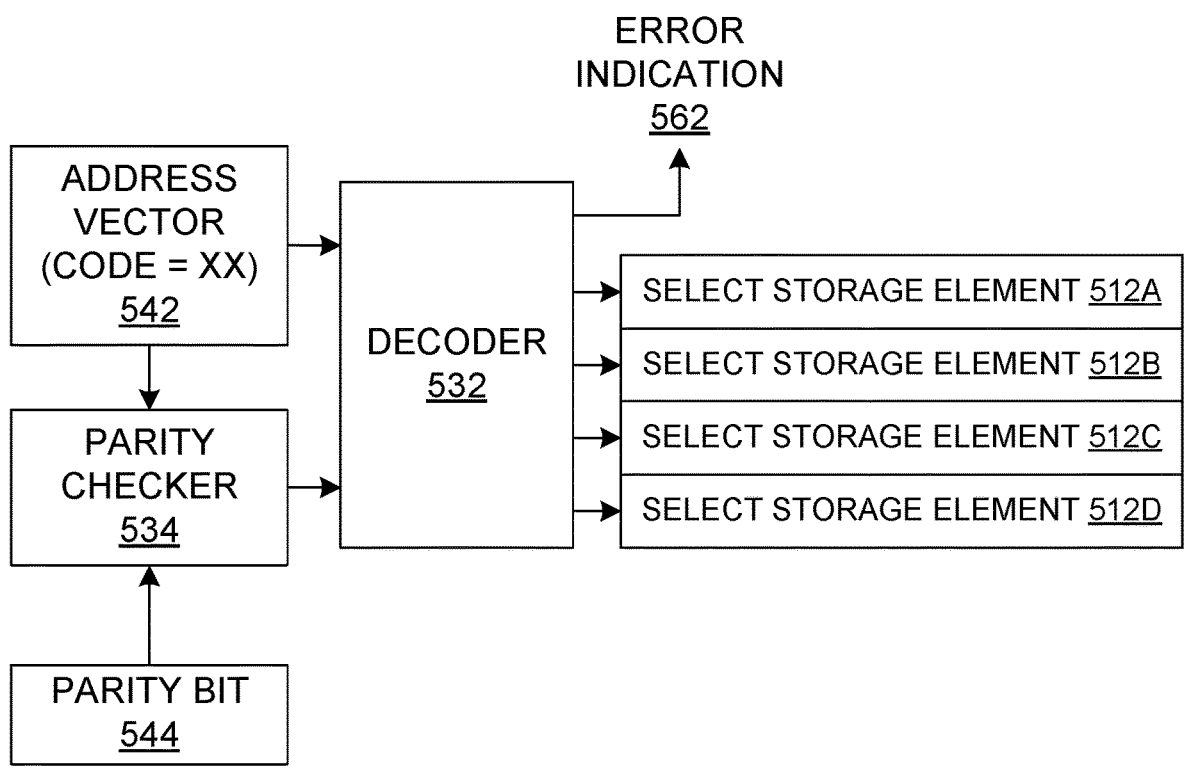

FIGS. 5A and 5B are conceptual block diagrams of decoders 530 and 532 for checking whether an address vector is valid, in accordance with the techniques of this disclosure. In response to receiving address vector 540 that matches the address associated with a setting for selecting data storage element 510A, decoder 530 may be configured to establish a data path to the associated data storage element by outputting a setting for selecting data storage element 510A. In examples in which address vector 540 is part of a read request, decoder 530 may be configured to retrieve the data stored in the data storage element by selecting data storage element 510A. Decoder 530 may then establish a data path for the data stored in that data storage element to the entity that sent the read request to decoder 530. In examples in which address vector 540 is part of a write request, decoder 530 may be configured to establish a data path to store the data included in the write request to the data storage element by selecting data storage element 510A for a write operation.

In response to receiving address vector 540 that does not match any of address vectors associated with selection of data storage elements 510A-510D, decoder 530 may be configured to output error indication 560. Decoder 530 can output error indication 560 to the requesting entity that sent address vector 540 to decoder 530 to inform the entity that the address vector is invalid. Decoders 530 and 532 may be configured to output error indications 560 and 562 as a distinct data value and/or via a separate wire. In some examples, decoder 530 may be configured to refrain from outputting any indication in response to determining that address vector 540 is an invalid address.

In the example shown in FIG. 5B, each of the address vectors includes a first part and a second part. Address vector 542 is a first part of a three-bit address vector, and parity bit 544 is a second part of the three-bit address vector. Parity bit 544 may be generated by applying a signature function to address vector 542. A simple example of a signature function is a single parity bit function, such as an even parity function or an odd parity function. For an even parity function, parity bit 544 may be set to one when there are an odd number of bits in address vector 542 equal to one, and parity bit 544 may be set to zero when there are an even number of bits in address vector 542 equal to one. Thus, in the example of even parity, when parity bit 544 is appended to address vector 542, there will be an even number of bits in the combined address vector equal to one.

Parity checker 534 may be configured to check whether a signature function is satisfied by address vector 542 and parity bit 544. Although FIG. 5B depicts a single parity bit 544, two or more parity bits may be used in some examples. In response to determining that the signature function is satisfied by address vector 542 and parity bit 544, parity checker 534 may be configured to output a signal to decoder 532 indicating that the signature function has been satisfied. Decoder 532 may be configured to establish a data path to the associated data storage element in response to receiving a signal from parity checker 534 indicating that the signature function has been satisfied.

In response to determining that the signature function is not satisfied by address vector 542 and parity bit 544, parity checker 534 may be configured to output a signal to decoder 532 indicating that the signature function has not been satisfied. In response to receiving a signal from parity checker 534 indicating that the signature function has not been satisfied, decoder 532 may be configured to output error indication 562. Decoder 532 can output error indication 562 to the entity that sent address vector 542 and parity bit 544 to decoder 532. In some examples, decoder 532 may be configured to refrain from outputting any signal in response to determining that address vector 542 is an invalid address.

Examples of signature functions include parity generation functions, hash generation functions, and cyclic redundancy check functions. One or more of the signature functions may be used to design the address vectors for data storage elements configured to store safety-related data. Additionally or alternatively, a circuit (e.g., parity checker 534) may be configured to check whether a second part of an address vector can be generated based on a first part of the address vector and further based on a signature function. Decoder 532 may be configured to calculate a checksum constant for each code based on a signature function. In the example of a single parity bit function, the number of constants to be handled by the header file and the programmer doubles, even though the number of valid constants remains the same.

Decoders 530 and 532 may have a different and simpler construction, as compared to existing decoders, because of the code representation shown in FIGS. 4A and 4B. For the generation of the code for a microcontroller in a computer, the microcontroller handles the codes of the bit fields as constants. To reduce effort and risk during the programming of the microcontroller (or other computing device), so-called header files may be used. A header file may contain pre-defined constants that are included in the code sections. For example, if a data field combination 01 results in the activation of a transistor at an output pin of a device, there may be a constant defined in the header file named OUT-PUT_ON with the value 01. In this example, a code of 10 may be used to deactivate the output. An additional constant definition OUTPUT_OFF with a value of 10 may then be defined by the header file. The programmer can use OUT-PUT_ON and OUTPUT_OFF instead of typing numeric values. This technique can reduce the risk of errors while programming. The device vendor often delivers these constants by header files. Whether a constant only includes setting bits or also includes checksum bit(s) does not change the number of constants for a bit field. The codes that are invalid do not appear in the header file. The change between the approaches shown in FIGS. 4A and 4B is that the minimum bit width of the constants change from two to three bits. Constants are represented by much larger numbers on a computer so there may not be any additional circuitry for the longer bit fields.

FIG. 6 illustrates an address scheme in which the valid addresses have a minimum Hamming distance of one. A device designed according to the techniques of this disclosure may include data storage elements with address vectors that are separated by a Hamming distance of only one. These data storage elements, however, may be configured to store data that is not safety critical, where safety-critical data may include data that, if stored or used incorrectly, could result in device failure.

The Hamming distance between two address vectors may be equal to the minimum number of bit flips that would cause one address vector to become the other address vector. For example, a Hamming distance of three between first and second address vectors means that at least three bits of the first address vector must be flipped to arrive at the second address vector.

The left column of the table depicted in FIG. 6 contains a four-bit address range. The full address range is associated with registers, where registers R00-R07 may relate to a first module, registers R10-R13 may relate to a second module, and registers R20-R23 may relate to a third module. In case of a bit flip of an address line in an address vector shown in FIG. 6, another data storage element would be selected for access. In case of a write operation, a data storage element may be unintentionally overwritten, whereas the value stored in the intended data storage element would remain unchanged. In case of a read operation, another data storage element could be selected unintentionally and its data contents may be interpreted as the data from the intended data storage element. In both cases, this error can result in a device failure.

In some examples, the address range may be extended by one bit for the register description and address generation in a microcontroller. In such examples, each single-bit error in the address vector can be detected without introducing an additional parity check mechanism on the internal bus of the slave device, as shown in FIG. 7. With a smart, spaced distribution of the addresses for data storage elements (e.g., according to the techniques of this disclosure), a set of data storage elements may be made robust against single bit-errors in an address vector without any additional hardware means (e.g. such as parity generators or checkers, etc.).

For example, a decoder may receive a write request including a configuration data value CFG and the address vector [A3, A2, A1, A0]=0010 for register R02. In examples in which an undetected single-bit-flip error occurred to bit A3 of the address vector, the decoder would write the value CFG to register R12, which is associated with the address vector 1010. In examples in which an undetected single-bit-flip error occurred to bit A2 of the address vector, the decoder would write the value CFG to register R06, which is associated with the address vector 0110. In examples in which an undetected single-bit-flip error occurred to bit A1 of the address vector, the decoder would write the value CFG to register R00, which is associated with the address vector 0000. In examples in which an undetected single-bit-flip error occurred to bit A0 of the address vector, the decoder would write the value CFG to register R03, which is associated with the address vector 0011.

FIGS. 7 and 8 illustrate an address scheme in which the valid addresses have a minimum Hamming distance of two, in accordance with the techniques of this disclosure. Here, an even parity approach has been selected to increase the Hamming distance between any two data storage elements. Only half of the address vectors shown in FIG. 7 are valid, because the address vector shows an even number of bits equal to one, while the other address vectors are invalid, because the address vector shows an odd number of bits equal to ones. The valid address vectors are associated with data storage elements, and the invalid address vectors are not associated with data storage elements. The registers shown in FIG. 7 can only be accessed with a valid address vector. Any attempt to access an invalid address vector will not lead to an access of another valid address vector and may additionally result in the decoder outputting an indication of an access error. With this type of distribution of data storage elements within the address range, the data storage elements may be made robust against single-bit errors in the address vector. This single-bit error detection for address vectors can be easily and fully integrated into an end-to-end protection scheme for data transfers between devices by using only address vectors that differ by more than one address bit value from another valid address vector.

As an example, a decoder may receive a write request including a configuration data value CFG and the five-bit address vector [A4, A3, A2, A1, A0]=00101 for register R02. As example for an address distribution with a Hamming distance of two based on an even parity scheme, address bit A0 of a valid address vector represents an even parity over the other four address bits. Without the parity bit at the end of the address vector, the four-bit address vector would be 0010. In examples in which an undetected single-bit-flip error occurred to bit A4 of the address vector, the decoder may be configured to determine that the address vector 10101 is invalid and not write the value CFG to any register.

In examples in which an undetected single-bit-flip error occurred to bit A3 of the address vector, the decoder may be configured to determine that the address vector 01101 is invalid and not write the value CFG to any register. In examples in which an undetected single-bit-flip error occurred to bit A2 of the address vector, the decoder may be configured to determine that the address vector 00001 is invalid and not write the value CFG to any register. In examples in which an undetected single-bit-flip error occurred to bit A1 of the address vector, the decoder may be configured to determine that the address vector 00111 is invalid and not write the value CFG to any register. In examples in which an undetected single-bit-flip error occurred to bit A0 of the address vector, the decoder may be configured to determine that the address vector 00100 is invalid and not write the value CFG to any register. All of the potential single-bit flips result in an empty address that is not associated with a register or data storage element.

The address scheme shown in FIG. 7 can be used without additional parity protection of the address vectors on the internal data bus. Moreover, the address scheme can ensure the end-to-end protection of the address information, even across several communication paths such as SPI, internal bus in a microcontroller, the internal bus in slave device, and any other communication paths. The generation of the code for a move operation including the correct, desired address at the beginning of the transfer channel may be performed via a header file used in the code generation of the microcontroller. The header file can define the available addresses in the slave device. The header file can contain the constant address vectors that are attributed to each register. The end-to-end protection can be completed via the address decoder in the slave device. The address decoder may be hard-coded into the circuitry of the slave device. Additionally or alternatively, the address decoder may include processing circuitry configured to execute instructions that cause the decoder to perform the techniques described herein.

The invalid address vectors shown in FIG. 7 can only be reached if a single-bit address error occurs to a valid address vector. In other words, a single-bit address error on a valid address vector will lead to an invalid address vector and will not result in an unintentionally overwrite for another register if an addressing scheme with a minimum Hamming distance of two is used.

Unlike the address scheme shown in FIG. 6, the addressing scheme shown in FIG. 7 is not linear. Thus, an address look-up table may be used to store the valid address vectors, along with the data to be written to the associated data storage elements. The address information can be easily generated via the header file. Although this address scheme results in invalid address vectors throughout the address space, hitting an empty address vector is preferable to writing a value to the wrong data storage element because of the potential effect on the operation of the device.

Thus, for the address scheme shown in FIG. 7, a write request that includes a valid address vector will not result in data being written to the wrong data storage element if a single-bit flip occurs in the address vector. This is because none of the valid address vectors shown in FIG. 7 are a single-bit flip away from any other valid address vector. In examples in which a single-bit flip occurs to an address vector in a write request, the decoder will not write the data to an unintended data storage element because the decoder will check whether the modified address vector is valid. The term "modified address vector" refers to the address vector that results from the bit flip. The decoder may be configured to output an indication that the modified address vector in the write request is invalid.

For the address scheme shown in FIG. 7, a read request that includes a valid address vector will not result in data being read from the wrong data storage element if a single-bit flip occurs in the address vector. In examples in which a single-bit flip occurs to an address vector in a read request, the decoder will not read data from an unintended data storage element because the decoder will check whether the modified address vector is valid. Instead, the decoder may be configured to output an indication that the modified address vector in the write request is invalid.

FIG. 8 illustrates an address space with icons used to show the invalid address vectors that would result from a single-bit flip of a valid address vector. For example, a valid five-bit address vector of 11110 has five possible single-bit flips: 01110, 10110, 11010, 11100, and 11111. FIG. 8 shows each of these five invalid address vectors marked with a white circle. In this way, the addressing scheme shown in FIG. 8 may exclude all address vectors that are a single bit different from any valid address vector. Another valid five-bit address vector of 11101 has five possible single-bit flips: 01101, 10101, 11001, 11111, and 11100. FIG. 8 shows each of these five invalid address vectors marked with a black circle.

FIG. 9 illustrates an address scheme in which the valid addresses have a minimum Hamming distance of three, in accordance with the techniques of this disclosure. For example, a valid five-bit address vector of 00000 has five possible single-bit flips: 10000, 01000, 00100, 00010, and 00001. There are ten additional address vectors that can be reached by flipping two bits of 00000: 00011, 00101, 00110, 01001, 01010, 01100, 10001, 10010, 10100, and 11000. FIG. 9 shows each of these fifteen invalid address vectors marked with a white circle. Another valid five-bit address vector of 00111 has two possible single-bit flips in addition to the address vector already marked with white circles: 10111 and 01111. There are six additional address vectors that can be reached by flipping two bits of 00111: 01011, 01101, 01110, 10011, 10101, and 10110. FIG. 8 shows each of these eight invalid address vectors marked with a black circle. In this way, the addressing scheme shown in FIG. 9 may exclude all address vectors that are at least two bits different from any valid address vector.

Figure 10:
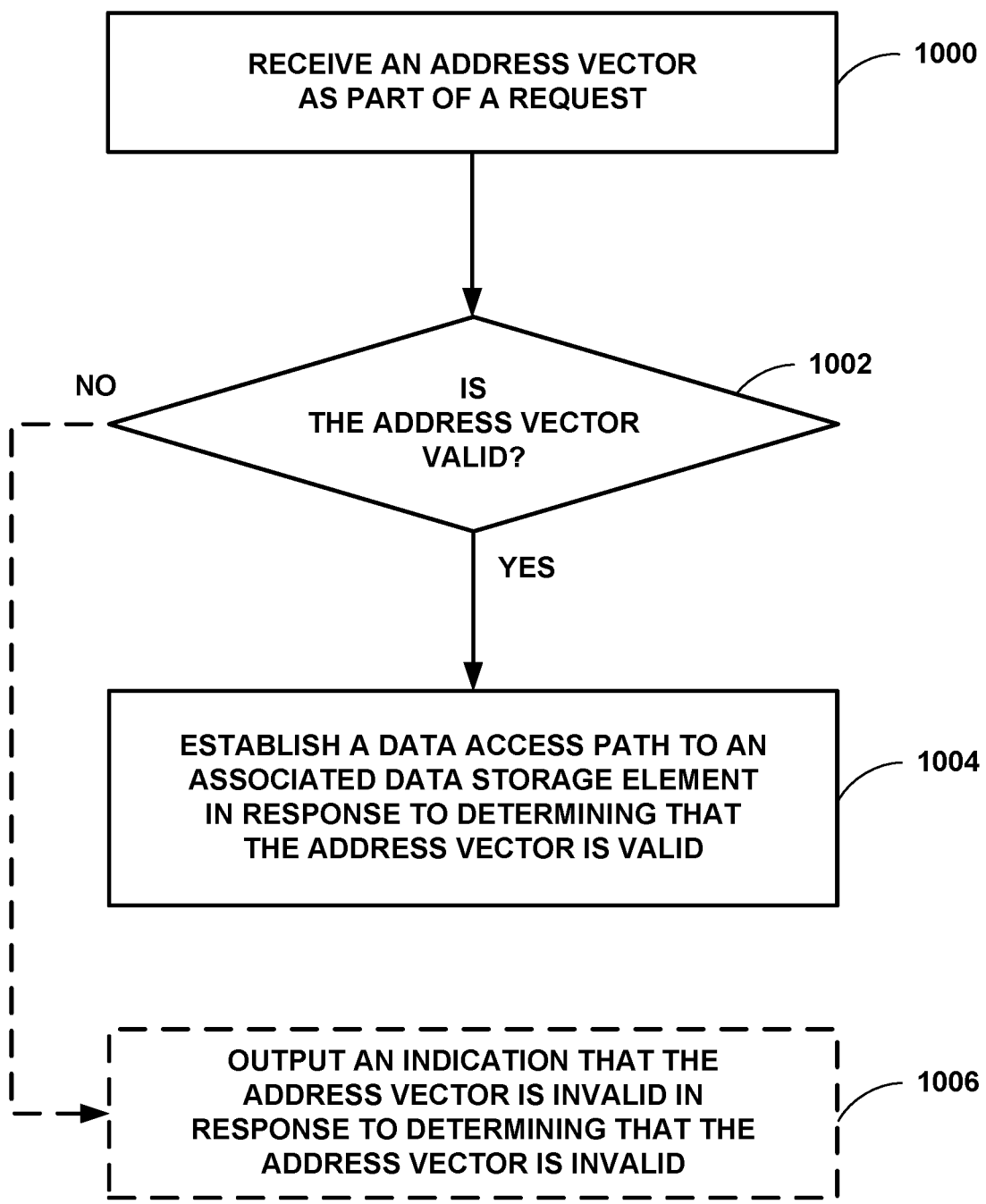
FIG. 10 is a flow diagram illustrating example techniques for writing data to a data storage element, in accordance with the techniques of this disclosure.

FIG. 10 is a flow diagram illustrating example techniques for writing data to a data storage element, in accordance with the techniques of this disclosure. Decoder 130 of device 100 shown in FIG. 1 will be described as performing the techniques of the example shown in FIG. 10, but other components, devices, and systems (e.g., decoders 132, 230, or 330) may perform similar functionality in other examples.

In the example of FIG. 10, decoder 130 receives an address vector as part of request 140 (1000). The request may be a write request with a data value to be written to one of data storage elements 110A-110B. Alternatively, the request may be a read request with a data value to be written to one of data storage elements 110A-110B.

Decoder 130 then determines whether the address vector in request 140 is valid (1002). Decoder 130 may be configured to compare the address vector to one or more valid address vectors to determine whether the address vector in request 140 matches the valid address vectors. In some examples, decoder 130 may be configured to output a setting to an address bus that is connected to data storage elements 110A-110N.

In response to determining that the address vector is valid, decoder 130 establishes a data access path to one of data storage elements 110A-110N (1004). Decoder 130 can establish the data access path to the data storage element that is associated with the address vector in request 140 by reading data from that storage element or by writing data to that storage element. In response to determining that the address vector is invalid, decoder 130 outputs an indication that the address vector is invalid (1006). Decoder 130 can output a distinct data value indicating the error, and/or decoder 130 can output a signal via a separate wire, where the separate wire can be used to communicate errors.

The following numbered clauses demonstrate one or more aspects of the disclosure.

Clause 1. A method includes receiving, by a decoder, a first request including a first address vector, where each data storage element of a set of data storage elements is associated with a respective valid address vector, and where a bit flip in any bit of any of the valid address vectors leads to one of a set of invalid address vectors not associated with any of the set of data storage elements. The method also includes checking, by the decoder, whether the first address vector corresponds to one of the valid address vectors or to one of the invalid address vectors. The method further includes selecting, by the decoder, an associated data storage element in response to receiving the first request and in response to determining that the first address vector corresponds to one of the valid address vectors.

Clause 2. The method of clause 1, further including outputting an indication that the first address vector is invalid in response to receiving the request and in response to determining that the first address vector corresponds to one of the invalid address vectors.

Clause 3. The method of clause 1 or clause 2, further including establishing a data path to write data to the associated data storage element in response to receiving the write request in response to determining that the first address vector corresponds to one of the valid address vectors.

Clause 4. The method of clauses 1-3 or any combination thereof, further including establishing a data path to read data from the associated data storage element in response to receiving the read request.

Clause 5. The method of clauses 1-4 or any combination thereof, further including receiving, by the decoder, a second request including a second address vector Clause 6. The method of clauses 1-5 or any combination thereof, further including outputting, by the decoder, an indication that the second address vector is invalid in response to receiving the second request and in response to determining that the second address vector corresponds to one of the invalid address vectors.

Clause 7. The method of clauses 1-6 or any combination thereof, where the first request includes a read request received, and where the method further includes establishing a data path to read the data from the associated data storage element in response to receiving the read request.

Clause 8. The method of clauses 1-7 or any combination thereof, where the set of data storage elements is a first set of data storage elements configured to store a first type of data, and where a second set of storage elements configured to store a second type of data.

Clause 9. The method of clauses 1-8 or any combination thereof, where a bit flip of an address vector of one of a second set of storage elements leads to another valid address vector for another one of the second set of data storage elements.

Clause 10. The method of clauses 1-9 or any combination thereof, where each address vector of the valid address vectors includes a respective first part and a respective second part.

Clause 11. The method of clauses 1-10 or any combination thereof, where a second part of a valid address vector is represented by a signature function applied to a first part of the respective address vector.

Clause 12. The method of clauses 1-11 or any combination thereof, where the signature function includes a parity generation function.

Clause 13. The method of clauses 1-12 or any combination thereof, where the signature function includes a hash generation function.

Clause 14. The method of clauses 1-13 or any combination thereof, where the signature function includes a cyclic redundancy check function.

Clause 15. The method of clauses 1-14 or any combination thereof, where the signature function ensures the valid address vectors have a Hamming distance of at least two compared to all other valid address vectors.

Clause 16. The method of clauses 1-15 or any combination thereof, where the signature function ensures the valid address vectors have a Hamming distance of at least three compared to all other valid address vectors.

Clause 17. The method of clauses 1-16 or any combination thereof, where the request includes a write request.

Clause 18. The method of clauses 1-17 or any combination thereof, where the request includes a read request.

Clause 19. The method of clauses 1-18 or any combination thereof, where the valid address vectors of storage elements are distributed such that each valid address vector of storage elements is at least two bits different from every other valid address vector.

Clause 20. The method of clauses 1-19 or any combination thereof, where the valid address vectors of storage elements are distributed such that each valid address vector of storage elements is at least three bits different from every other valid address vector.

Clause 21. A device includes a set of data storage elements, where each data storage element of the set of data storage elements is associated with a respective valid address vector, and where a bit flip in any bit of any of the valid address vectors leads to one of a set of invalid address vectors not associated with any of the set of data storage elements. The device also includes a decoder configured to receive a first address vector as part of a request and to check whether the first address vector corresponds to one of the valid address vectors or to one of the invalid address vectors. The decoder is also configured to select an associated data storage element in response to receiving the request and in response to determining that the first address vector corresponds to one of the valid address vectors.

Clause 22. The device of clause 21, where the decoder is configured to perform the method of clauses 1-20 or any combination thereof.

Clause 23. The device of clause 21 of clause 22, where the first request includes a read request received, and where the decoder is configured to establish a data path to read the data from the associated data storage element in response to receiving the read request.

Clause 24. The device of clauses 21-23 or any combination thereof, where the set of data storage elements is a first set of data storage elements configured to store a first type of data, and where a second set of storage elements configured to store a second type of data.

Clause 25. The device of clauses 21-24 or any combination thereof, where a bit flip of an address vector of one of a second set of storage elements leads to another valid address vector.

Clause 26. The device of clauses 21-25 or any combination thereof, where each address vector of the valid address vectors includes a respective first part and a respective second part.

Clause 27. The device of clauses 21-26 or any combination thereof, where a second part of a valid address vector is represented by a signature function applied to a first part of the respective address vector.

Clause 28. The device of clauses 21-27 or any combination thereof, where the signature function includes a parity generation function.

Clause 29. The device of clauses 21-28 or any combination thereof, where the signature function includes a hash generation function.

Clause 30. The device of clauses 21-29 or any combination thereof, where the signature function includes a cyclic redundancy check function.

Clause 31. The device of clauses 21-30 or any combination thereof, where the signature function ensures the valid address vectors have a Hamming distance of at least two compared to all other valid address vectors.

Clause 32. The device of clauses 21-31 or any combination thereof, where the signature function ensures the valid address vectors have a Hamming distance of at least three compared to all other valid address vectors.

Clause 33. The device of clauses 21-32 or any combination thereof, where the request includes a write request.

Clause 34. The device of clauses 21-33 or any combination thereof, where the request includes a read request.

Clause 35. The device of clauses 21-34 or any combination thereof, where the valid address vectors of storage elements are distributed such that each valid address vector of storage elements is at least two bits different from every other valid address vector.

Clause 36. The device of clauses 21-35 or any combination thereof, where the valid address vectors of storage elements are distributed such that each valid address vector of storage elements is at least three bits different from every other valid address vector.

Clause 37. A system includes a communication slave device and a communication master device coupled via a communication interface to the communication slave device and configured to exchange data with the communication slave device. The communication slave device includes a set of data storage elements, where each data storage element of the set of data storage elements is associated with a respective valid address vector, and where a bit flip in any bit of any of the valid address vectors leads to one of a set of invalid address vectors not associated with any of the set of data storage elements. The communication slave device includes a decoder configured to receive a first address vector as part of a request from the communication master device. The decoder is also configured to check whether the first address vector corresponds to one of the valid address vectors or to one of the invalid address vectors. The decoder is further configured to select an associated data storage element in response to receiving the request and in response to determining that the first address vector corresponds to one of the valid address vectors.

Clause 38. The system of clause 37, where the decoder is configured to perform the method of clauses 1-20 or any combination thereof.

Clause 39. The system of clause 37 of clause 38, further including a PCB, where the communication master device is mounted to the PCB, and where the communication slave device is mounted to the PCB.

Clause 40. The system of clauses 37-39 or any combination thereof, where the communication interface of the communication master device has an ASIL safety rating of QM.

Clause 41. The system of clauses 37-40 or any combination thereof, where the communication interface of the communication master device has an ASIL safety rating of ASIL A.

Clause 42. The system of clauses 37-41 or any combination thereof, where the communication interface of the communication master device has an ASIL safety rating lower than an ASIL rating of a function of the communication slave device controlled by the data transferred by the communication interface.

Clause 43. A device includes a computer-readable medium having executable instructions stored thereon, configured to be executable by processing circuitry for causing the processing circuitry to perform the method of examples 1-20 or any combination thereof.

Clause 44. A system includes means for performing the method of examples 1-20 or any combination thereof.

This disclosure has attributed functionality to devices 100, 102, 200, 300, and 380, data storage elements 110A-110N, 112A-112N, 120A-120N, and 210, decoders 130, 132, 230, and 330, processing circuitry 250, microcontroller 280, bus master 332, and modules 350-352. Devices 100, 102, 200, 300, and 380, data storage elements 110A-110N, 112A-112N, 120A-120N, and 210, decoders 130, 132, 230, and 330, processing circuitry 250, microcontroller 280, bus master 332, and modules 350-352 may include processing circuitry such as one or more processors. Devices 100, 102, 200, 300, and 380, data storage elements 110A-110N, 112A-112N, 120A-120N, and 210, decoders 130, 132, 230, and 330, processing circuitry 250, microcontroller 280, bus master 332, and modules 350-352 may include any combination of integrated circuitry, discrete logic circuity, analog circuitry, such as one or more microprocessors, digital signal processors (DSPs), application specific integrated circuits (ASICs), and/or field-programmable gate arrays (FPGAs). In some examples, devices 100, 102, 200, 300, and 380, data storage elements 110A-110N, 112A-112N, 120A-120N, and 210, decoders 130, 132, 230, and 330, processing circuitry 250, microcontroller 280, bus master 332, and modules 350-352 may include multiple components, such as any combination of one or more microprocessors, one or more DSPs, one or more ASICs, or one or more FPGAs, as well as other discrete or integrated logic circuitry, and/or analog circuitry.

The techniques described in this disclosure may also be encoded in instructions and data stored to a non-transitory computer-readable storage medium, such as modules 350-352. Example non-transitory computer-readable storage media may include RAM, ROM, programmable ROM (PROM), erasable programmable ROM (EPROM), electronically erasable programmable ROM (EEPROM), flash memory, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A device comprising:
a set of data storage elements, wherein each data storage element of the set of data storage elements is associated with a respective valid address vector, and wherein a bit flip in any bit of any of the valid address vectors leads to one of a set of invalid address vectors not associated with any of the set of data storage elements; and
a decoder configured to:
receive a first address vector as part of a request;
check whether the first address vector corresponds to one of the valid address vectors or to one of the invalid address vectors; and
select an associated data storage element in response to receiving the request and in response to determining that the first address vector corresponds to one of the valid address vectors,
wherein each address vector of the valid address vectors comprises a respective first part and a respective second part, and
wherein the second part of a valid address vector is represented by a signature function applied to the first part of the respective valid address vector.

2. The device of claim 1, wherein the decoder is configured to output an indication that the first address vector is invalid in response to receiving the request and in response to determining that the first address vector corresponds to one of the invalid address vectors.

3. The device of claim 1,
wherein the set of data storage elements is a first set of data storage elements configured to store a first type of data,
wherein the device further comprises a second set of storage elements configured to store a second type of data, and
wherein a bit flip of an address vector of one of the second set of storage elements leads to another valid address vector for another one of the second set of data storage elements.

4. The device of claim 1, wherein the signature function comprises a parity generation function.

5. The device of claim 1, wherein the signature function comprises a hash generation function.

6. The device of claim 1, wherein the signature function comprises a cyclic redundancy check function.

7. The device of claim 1, wherein the signature function ensures the valid address vectors have a hamming distance of at least two compared to all other valid address vectors.

8. The device of claim 1,
wherein the request comprises a write request, and
wherein the decoder is configured, in response to determining that the first address vector corresponds to one of the valid address vectors, to establish a data path to write data to the associated data storage element in response to receiving the write request.

9. The device of claim 1,
wherein the request comprises a read request, and
wherein the decoder is configured, in response to determining that the address vector corresponds to one of the valid address vectors, to establish a data path to read data from the associated data storage element in response to receiving the read request.

10. The device of claim 1, wherein the valid address vectors of storage elements are distributed such that each valid address vector of storage elements is at least two bits different from every other valid address vector.

11. The device of claim 1, wherein the valid address vectors of storage elements are distributed such that each valid address vector of storage elements is at least three bits different from every other valid address vector.

12. The device of claim 1, wherein the decoder comprises circuitry.

13. A system comprising:
a communication slave device; and
a communication master device coupled via a communication interface to the communication slave device and configured to exchange data with the communication slave device,
wherein the communication slave device comprises:
a set of data storage elements, wherein each data storage element of the set of data storage elements is associated with a respective valid address vector, and wherein a bit flip in any bit of any of the valid address vectors leads to one of a set of invalid address vectors not associated with any of the set of data storage elements; and
a decoder configured to:
receive a first address vector as part of a request from the communication master device;
check whether the first address vector corresponds to one of the valid address vectors or to one of the invalid address vectors; and
select an associated data storage element in response to receiving the request and in response to determining that the first address vector corresponds to one of the valid address vectors,
wherein each address vector of the valid address vectors comprises a respective first part and a respective second part, and
wherein the second part of a valid address vector is represented by a signature function applied to the first part of the respective valid address vector.

14. The system of claim 13, wherein the communication interface of the communication master device has an Automotive Safety Integrity Level (ASIL) safety rating lower than an ASIL rating of a function of the communication slave device controlled by the data transferred by the communication interface.

15. The system of claim 13, wherein the decoder is configured to output an indication that the first address vector is invalid in response to receiving the request and in response to determining that the first address vector corresponds to one of the invalid address vectors.

16. The system of claim 13, further comprising a printed circuit board (PCB),
wherein the communication master device is coupled to the PCB, and
wherein the communication slave device is coupled to the PCB.

17. The system of claim 13,
wherein the signature function comprises a parity generation function, a hash generation function, or a cyclic redundancy check function.

18. A method comprising:
receiving, by a decoder, a first request including a first address vector, wherein each data storage element of a set of data storage elements is associated with a respective valid address vector, and wherein a bit flip in any bit of any of the valid address vectors leads to one of a set of invalid address vectors not associated with any of the set of data storage elements;

checking, by the decoder, whether the first address vector corresponds to one of the valid address vectors or to one of the invalid address vectors; and selecting, by the decoder, an associated data storage element in response to receiving the first request and in response to determining that the first address vector corresponds to one of the valid address vectors wherein each address vector of the valid address vectors comprises a respective first part and a respective second part, and wherein the second part of a valid address vector is represented by a signature function applied to the first part of the respective valid address vector.

19. The method of claim 18, further comprising:

receiving, by the decoder, a second request including a second address vector; and outputting, by the decoder, an indication that the second address vector is invalid in response to receiving the second request and in response to determining that the second address vector corresponds to one of the invalid address vectors.

20. The method of claim 18, wherein the first request comprises a read request received from a microcontroller, the method further comprising establishing a data path to read the data from the associated data storage element in response to receiving the read request.

* * * * *